United States Patent [19]

Walker et al.

[11] Patent Number: 5,830,957

[45] Date of Patent: Nov. 3, 1998

[54] RESINS FORMED FROM ALPHA-BETA-UNSATURATED MONOMERS AND UNSATURATED FATTY ACIDS

[75] Inventors: Stephen L. Walker, Marengo; Gary A. Deeter, Crystal Lake; George G. Stuart, II, Belvidere, all of Ill.

[73] Assignee: Morton International, Inc., Chicago, Ill.

[21] Appl. No.: 880,479

[22] Filed: Jun. 23, 1997

[51] Int. Cl.$^6$ ..................................................... C08F 20/04

[52] U.S. Cl. .......................................................... 526/318.3

[58] Field of Search ........................................... 526/318.3

[56] References Cited

PUBLICATIONS

In–house Computer–generated abstract pp. 25–26 Answer 15 of 49 document 120:193360 Masayuki et al, JP 92–77499–920331.

*Primary Examiner*—Bernard Lipman
*Assistant Examiner*—N. Sarofim
*Attorney, Agent, or Firm*—Wayne E. Nacker; Gerald K. White

[57] ABSTRACT

A polymer is formed from a mixture of between about 85 and about 96 wt % α-β-unsaturated monomers and between about 4 and about 15 wt % unsaturated fatty acids having between 10 and 30 carbons.

9 Claims, No Drawings

RESINS FORMED FROM ALPHA-BETA-UNSATURATED MONOMERS AND UNSATURATED FATTY ACIDS

The present invention addresses the polymerization of α-β-unsaturated compounds, such as (meth)acrylate, vinyl, styrene, and substituted styrene monomers in the presence of unsaturated fatty acids. The partial incorporation of these unsaturated compounds into the resin composition reduces melt viscosity such that the resins can be synthesized in the absence of added co-solvent independent of the polymerization process. The composition presented in this invention differs from the state of the art because all current compositions require the addition of co-solvent prior to polymerization and at some later point is either reacted with the polymer or removed. However, due to processing restrictions and non-quantitative conversion and/or removal the resultant polymers still contain a significant amount of the added co-solvent.

INVENTION BACKGROUND

Typically, carboxyl functional (meth)acrylic and/or styrene/(meth)acrylic resins are prepared using batch or continuous processes. Inherent to these materials is their high melt viscosity making processing difficult. To circumvent this problem co-solvent is typically added. The added co-solvent is then either partially removed from or reacted with the polymer leaving between 2 and 10% volatile compounds in the material. These materials then can be neutralized with alkaline water to form aqueous solutions or dispersions depending on the amount of polymer carboxylation. The resultant waterborne resin can be formulated into volatile organic content (VOC) containing latexes, coatings, printing inks, and overprint varnishes.

The uniqueness of the composition discussed in this invention is that it yields polymers with low melt viscosity enabling their polymerization without the addition of co-solvent. This facilitates the preparation of no VOC latexes, coatings, printing inks, and overprint varnishes.

Although the immediate interest of this invention pertains to water soluble and dispersible resins with varying carboxyl content and their preparation using a continuous reactor approach, this technology can be generally applicable to any α,β-unsaturated resin and their synthesis regardless of technique. In all events, polymerization of α,β-unsaturated monomers in the presence of unsaturated fatty acids decreases the resultant polymer's melt viscosity which facilitates processing in the absence of solvents.

INVENTION SUMMARY

The present invention generally describes polymers prepared from α,β-unsaturated compounds, such as (meth)acrylate, vinyl, styrene, and substituted styrene monomers in the presence of unsaturated fatty acids. Generally, the fatty acids are used between 4 and 15 wt % (based on total monomer weight), preferably between 5 and 12 wt %. The unsaturated fatty acids may be composed of 10 to 30 carbon atoms, preferably 12 to 20 carbon atoms. The polymers of the above composition may be synthesized using continuous, batch, or semi-continuous technology in the absence of organic solvent.

DETAILED DESCRIPTION OF CERTAIN PREFERRED EMBODIMENTS

Herein, unless otherwise noted, monomer, fatty acid, and initiator percentages are weight percentages relative to total monomer weight.

The polymers discussed in this invention typically consist of up to 96 wt % (meth)acrylic monomers, up to 80 wt % styrene monomer, and up to 50 wt % other α,β-unsaturated compounds or substituted styrene monomers. Typically polymers in accordance witht he invention contain at least about 10 wt % (meth)acrylic monomers. Typically polymers in accordance with the invention contain at least about 5 wt % styrene or substituted styrene monomer.

Examples of (meth)acrylic monomers useful in the present invention include, but are not limited to (meth) acrylic acid and their ester derivatives such as methacrylate, ethyl acrylate, butyl acrylate, isobutyl acrylate, 2-ethylhexyl acrylate, hydroxyethyl acrylate, hydroxypropyl acrylate, hydroxybutyl acrylate, methyl methacrylate, ethyl methacrylate, butyl methacrylate, isobutyl methacrylate, tertiarybutyl methacrylate, 2-ethylhexyl methacrylate, isobornyl methacrylate, hydroxyethyl methacrylate, hydroxypropyl methacrylate, lauryl methacrylate, and stearyl methacrylate.

Styrene monomers useful in the present invention include, but are not limited to styrene, α-methyl styrene, vinyl toluene, and tertiarybutyl styrene. Other vinyl monomers useful in the present invention include but are not limited to vinyl alcohol and its ester derivatives such as vinyl acetate and vinyl 2-ethylhexanoate, crotonic acid, and maleic anhydride.

The fatty acids that are partially incorporated into the polymeric materials in accordance with the invention must have at least one carbon-carbon double bond. If multiple carbon-carbon double bonds are present it is not required that they be conjugated. Additionally, the fatty acids do not have to be used as their free acids but may be esterified with a variety of alcohols prior to or during polymerization. Suitable examples of unsaturated fatty acids are as follows but are not limited to lauroleic acid, myristoleic acid, palmitoleic acid, oleic acid, ricinoleic acid, linoleic acid, linolenic acid, eleostearic acid, laconic acid, gadoleic acid, arachidonic acid, erucic acid, clupanodonic acid, and nisinic acid.

The polymeric materials described in this invention are produced by a free radical mechanism. Therefore, a free radical initiator must be employed, the type and amount of which is dependant upon monomer mix and the reaction parameters of temperature, pressure, and time. Typically, the amount of initiator is in the range of 1 to 10% based on monomer weight. To those experienced in the art examples of free radical initiators is evident. The present invention pertains to the following examples but is not limited to 1,1-di-(tert-butyl peroxy)-3,3,5-trimethylcyclohexane, 2,2-bis[4,4-di-(tert-butylperoxycyclohexyl)]propane, tert-butyl peroxy-3,5,5-trimethylhexanoate, tert-butyl peroxy-2-methylbenzoate, 2,2-di-(tert-butyl peroxy) butane, tert-butylperoxy isopropyl carbonate, tert-butyl peroxyacetate, tert-butyl peroxybenzoate, dicumyl peroxide, di-tert-butyl peroxide, diisopropylbenzene monohydroperoxide, and cumyl hydroperoxide.

In a typical polymerization process the α,β-unsaturated monomers, unsaturated fatty acid(s), and initiator(s) are mixed together prior to reactor injection. The reactor is heated to a temperature that will provide an adequate rate of initiator decomposition. Once polymerization begins the reactor may exotherm approximately 50° to 100° C. and care must be taken not to exceed 250° C. For example, when di-tert-butyl peroxide is employed the reactor may be heated to 155° to 1 65° C. and the exotherm may raise the temperature to 200° to 220° C.

Final polymer physical characteristics are dependant upon monomer content, initiator type and quantity, and reaction time and temperature. The number average molecular weight of the describe resins typically range between 1 500 to 10000 and preferably between 3000 to 5000. Polymer acid number can also be varied dependent upon desired degree of water solubility or dispersibility. That is resin acid numbers may range between 80 and 275, preferably between 125 and 250, and most preferably between 150 and 200. However, the present invention which describes unsaturated fatty acid modified resins should be applicable regardless of molecular weight or acid number. Aqueous solutions or dispersions may be prepared with the above describe resins by simply mixing with a solution of water and base. To expedite this process elevated temperatures below the water/base boiling point(s) may be used. The resultant polymer solution or dispersion can be formulated into no VOC pigment dispersions, latexes, coatings, printing inks, or overprint varnishes.

The following examples explain the present invention in greater detail.

EXAMPLE I

|  | Wt. % |
|---|---|
| Monomer Feed |  |
| Styrene | 48.0 |
| a-Methyl Styrene | 15.0 |
| Acrylic Acid | 22.5 |
| Viscosity Modifier |  |
| Oleic Acid | 9.5 |
| Seed Initiator |  |
| TBPEH* | 0.7 |
| Bulk Initiator |  |
| DTBP** | 4.3 |

*tert-butyl peroxy-2-ethylhexanoate
**Di-tert-butyl peroxide

EXAMPLE II

|  | Wt. % |
|---|---|
| Monomer Feed |  |
| Styrene | 48.0 |
| a-Methyl Styrene | 15.0 |
| Acrylic Acid | 22.5 |
| Viscosity Modifier |  |
| Linoleic Acid | 9.5 |
| Seed Initiator |  |
| TBPEH* | 0.7 |
| Bulk Initiator |  |
| DTBP* | 4.3 |

*tert-butyl peroxy-2-ethylhexanoate
**Di-tert-butyl peroxide

Examples I and II Procedure

Approximately 15% of the Monomer Feed was added to the reaction kettle. The mixture was stirred, purged with nitrogen, and heated to 95° C. Once at the desired polymerization temperature the Seed Initiator was dissolved in 5 grams of Monomer Feed and added to the pot charge. The reaction was allowed to exotherm and held at 120° C. for 10 minutes. After the hold was completed the reaction mixture was heated to 165° C. While heating the Viscosity Modifier and Bulk Initiator to the remainder of the Monomer Feed. The resultant mixture was added to the reaction kettle over a 3 hour period. Once the addition was complete, the mixture was held for 30 minutes and the resin removed from the reaction kettle. The cooled resin was a brittle solid.

EXAMPLE III

|  | Wt. % |
|---|---|
| Viscosity Modifier |  |
| Oleic Acid | 8.2 |
| Monomer Feed |  |
| Methyl Methacrylate | 58.2 |
| Ethyl Acrylate | 4.3 |
| Butyl Acrylate | 4.3 |
| Acrylic Acid | 7.8 |
| Methacrylic Acid | 7.8 |
| Oleic Acid | 5.1 |
| DTBP* | 4.3 |

*Di-tert-butyl peroxide

EXAMPLE IV

|  | Wt. % |
|---|---|
| Viscosity Modifier |  |
| Linoleic Acid | 8.2 |
| Monomer Feed |  |
| Methyl Methacrylate | 58.2 |
| Ethyl Acrylate | 4.3 |
| Butyl Acrylate | 4.3 |
| Acrylic Acid | 7.8 |
| Methacrylic Acid | 7.8 |
| Linoleic Acid | 5.1 |
| DTBP* | 4.3 |

*Di-tert-butyl peroxide

Example III and IV Procedure

The Viscosity Modifier was added to the reaction kettle, stirred, purged with nitrogen, and heated to 165° C. Once at the desired polymerization temperature, the Monomer Feed was added to the reaction kettle over a 4 hour time period. Once addition was complete, it was held for 30 minutes and the resin was removed from the reaction kettle. The cooled resin was a brittle solid.

EXAMPLE V

| Component | Wt. % |
|---|---|
| Styrene | 53.5 |
| Acrylic Acid | 30.7 |
| Oleic Acid | 10.2 |
| DTBP | 5.6 |

*Di-tert-butyl peroxide

Example V Procedure

The monomer, initiator mixture was fed at a rate of 140 Kg/hr and a dwell time of 15 to 20 minutes through a continuous flow reactor. The reactor was at 165° C. at the start of the monomer/initiator feed and exothermed to 220° C. Upon full cooling the solid polymer was used to prepare alkaline polymer solutions as follows.

| Component | Wt. % |
|---|---|
| Resin | 30.0 |
| DI Water | 8.9 |
| NH$_4$OH (30% solution) | 61.1 |

Aqueous Cut Procedure

The solid resin and DI water were added to the reaction flask, stirred rapidly and the ammonium hydroxide was added dropwise over a 20 minute time period. The mixture was slowly heated to 80° C. and until the resin was all dissolved. The polymer solution was cooled and removed from reaction flask. Typical physical properties were pH between 7.9 and 8.9, viscosity between 450 and 1 500 cps, and non-volatiles between 29 and 32%.

What is claimed:

1. A polymer formed from a mixture of between about 85 and about 96 wt % α,β-unsaturated monomers selected from the group consisting of vinyl monomers, styrene and substituted styrene monomers and (meth)acrylic monomers and between about 4 and about 15 wt % unsaturated fatty acids having between 10 and 30 carbons.

2. A polymer according to claim 1, wherein said fatty acids have between 12 and 20 carbons.

3. A method of producing a polymer providing a mixture of between about 85 and about 96 wt % α,β-unsaturated monomers selected from the group consisting of vinyl monomers, styrene and substituted styrene monomers and (meth)acrylic monomers and between about 4 and about 15 wt % unsaturated fatty acids having between 10 and 30 carbons, and polymerizing said monomers by free radical polymerization.

4. A method according to claim 3 implementing continuous polymerization processes.

5. A method according to claim 3 implementing batch polymerization processes.

6. A method according to claim 3 implementing semi-continuous polymerization processes.

7. A method according to claim 3 carried out in the absence of co-solvent.

8. The polymer according to claim 1 wherein said α,β-unsaturated monomers are selected from the group consisting of styrene and substituted styrene monomers and (meth)acrylic monomers.

9. The method according to claim 3 wherein said α,β-unsaturated monomers are selected from the group consisting of styrene and substituted styrene monomers and (meth)acrylic monomers.

* * * * *

UNITED STATES PATENT AND TRADEMARK OFFICE
CERTIFICATE OF CORRECTION

PATENT NO. : 5,830,957
DATED : November 3, 1998
INVENTOR(S) : Walker et al.

It is certified that error appears in the above-indentified patent and that said Letters Patent is hereby corrected as shown below:

*Column 2, line 53, delete* `"tert-butyl peroxy)and insert --tert-butylperoxy)--`.
*Column 2, line 66, delete "1 65°" and insert --165°--.*
*Column 3, line 4, delete "1 500" and insert --1500--.*

Signed and Sealed this

Eighteenth Day of May, 1999

Attest:

Q. TODD DICKINSON

*Attesting Officer*  Acting Commissioner of Patents and Trademarks